United States Patent [19]

Glass et al.

[11] Patent Number: 5,431,962
[45] Date of Patent: Jul. 11, 1995

[54] ABRASION RESISTANT FLOOR COVERING

[75] Inventors: Jeffrey J. Glass, Tulsa, Okla.; Eugene R. Schisel, Burlington, Iowa

[73] Assignee: ChemProof Polymers, Inc., Tulsa, Okla.

[21] Appl. No.: 285,816

[22] Filed: Aug. 4, 1994

Related U.S. Application Data

[63] Continuation-in-part of Ser. No. 173,125, Dec. 27, 1993, abandoned.

[51] Int. Cl.$^6$ .......................... B05D 3/12; B05D 7/24
[52] U.S. Cl. .................................. 427/403; 427/407.1
[58] Field of Search ............. 427/136, 403, 140, 407.1

[56] References Cited

U.S. PATENT DOCUMENTS

| | | | |
|---|---|---|---|
| 3,334,555 | 8/1967 | Nagin | 427/136 |
| 3,801,347 | 4/1974 | Keller . | |
| 3,908,043 | 9/1975 | Evans et al. | 427/203 |
| 3,935,339 | 1/1976 | Cooke, Jr. | 427/386 |
| 4,339,289 | 7/1982 | Lankard | 427/136 |
| 4,363,836 | 12/1982 | Sakato et al. | 427/407.1 |
| 4,400,413 | 8/1983 | Emmons et al. | 427/136 |
| 4,689,268 | 8/1987 | Meader, Jr. | 427/136 |
| 4,725,457 | 2/1988 | Ward et al. | 427/386 |
| 4,746,552 | 5/1988 | Tokumoto et al. | 427/403 |
| 4,761,313 | 8/1988 | Jacobs | 427/403 |
| 5,049,411 | 9/1991 | Sellstrom | 427/136 |
| 5,120,574 | 6/1992 | Cogliano et al. . | |
| 5,344,856 | 9/1994 | Klein | 427/386 |

FOREIGN PATENT DOCUMENTS 402811  12/1933  United Kingdom ................ 427/132

OTHER PUBLICATIONS

Scientific American, *Waterproofing Concrete*, Oct. 2, 1915, p. 291.
Derwent Abstract 10332T-A, of Dutch patent document 7,010,960; Jan. 1972.

*Primary Examiner*—Diana Dudash
*Attorney, Agent, or Firm*—William S. Dorman

[57] ABSTRACT

A floor covering designed to protect concrete floors from extreme mechanical abuse, such as impact and abrasion involving a floor covering which is applied in three steps:

the first layer comprises a thermosetting resin with aggregate fillers and broadcast;

the second layer is a thermosetting resin compound which serves as a bonding agent between the first layer and the next layer to be applied;

the third layer comprises a latex-based cementitious material filled with ductile iron filings.

14 Claims, No Drawings

ABRASION RESISTANT FLOOR COVERING

CROSS-REFERENCE TO RELATED APPLICATIONS

This application is a continuation-in-part of U.S. patent application Ser. No. 08/173,125, filed Dec. 27, 1993 for "Abrasion Resistant Floor Covering", now abandoned.

BACKGROUND OF THE INVENTION

1. Field of the Invention

The present invention relates to a floor covering designed to protect concrete floors from extreme mechanical abuse, such as impact and abrasion. More particularly, this invention involves a floor covering which is applied in three steps:

the first layer comprises a thermosetting resin with aggregate fillers and broadcast;

the second layer is a thermosetting resin compound which serves as a bonding agent between the first layer and the next layer to be applied;

the third layer comprises a latex-based cementitious material filled with ductile iron filings.

2. The Prior Art

Concrete is subject to mechanical abuses, resulting in its eventual failure, in virtually every industrial setting. For many years, polymeric floor coatings have been used to protect concrete floors from light to moderate mechanical abuses commonly found in the industrial sector. However, when subject to severe impact and, more importantly, severely abrasive environments, the friction generated between the polymeric floor and the abrasive actor generates heat sufficient enough to exceed the Heat Deflection Temperature (HDT) of the polymeric floor, resulting in failure of the floor.

Iron filled cementitious overlayments have been used by themselves for several years to provide impact and abrasion resistance. These systems alone have several drawbacks. First, cementitious materials are inherently prone to bond failure when applied over a concrete substrate. Secondly, because of the cure through the hydration of water, a 28 day waiting period prior to putting the area back into use must be made available. Thirdly, if not cured properly, cementitious overlayments are very prone to shrinkage cracks, resulting in its eventual debonding and failure.

It is the purpose of this invention to combine the two aforementioned systems, therefore overcoming their individual drawbacks and producing a highly mechanical, abuse-resistant floor coating.

Searches were conducted on the present invention and the following listed documents represent the results of these searches:

| Patent No. | Inventor | Issue Date |
| --- | --- | --- |
| 3,334,555 | Nagin, et al. | 08/08/67 |
| 3,908,043 | Evans, et al. | 09/23/75 |
| 4,339,289 | Lankard | 07/13/82 |
| 4,363,836 | Sakato, et al. | 12/14/82 |
| 4,400,413 | Emmons, et al. | 08/23/83 |
| 4,689,268 | Meader, Jr. | 08/25/87 |
| 4,746,552 | Tokumoto, et al. | 05/24/88 |
| 4,761,313 | Jacobs | 08/02/88 |
| 5,049,411 | Sellstrom, et al. | 09/17/91 |
| 5,120,574 | Cogliano, et al. | 06/09/92 |
| UK Pat. 402,811 | Swindin | 12/07/33 |
| Netherlands 7,010,960 | Chemie | 01/26/72 |

Article in *Scientific American* "Waterproofing Concrete", Oct. 2, 1915, page 291.

U.S. Pat. No. 4,746,552 to Tokumoto, et al. discloses a concrete finish with polyester emulsion topped with a cement layer.

U.S. Pat. No. 4,689,268 to Meader, Jr. discloses concrete coated with epoxy, bonding agent and then a polyurethane.

U.S. Pat. No. 4,363,836 to Sakato, et al. discloses concrete coated with polyvinyl alcohol/vinyl acetate. The outer layer is cement.

U.S. Pat. No. 4,400,413 to Emmons, et al. discloses an acrylic latex concrete.

U.S. Pat. No. 3,908,043 to Evans, et al. teaches an epoxy overcoat on a concrete floor.

U.S. Pat. No. 5,120,574 to Cogliano, et al. discloses use of a polymeric concrete overlay with a methacrylic primer.

U.S. Pat. No. 3,334,555 to Nagin, et al. discloses the use of an epoxy in conjunction with aluminum oxide to act as the primary wear surface for a traffic bearing surface.

U.S. Pat. No. 4,339,289 to Lankard demonstrates a method of constructing a concrete patching material through the use of steel fibers.

U.S. Pat. No. 4,761,313 to Jacobs discloses a method of applying a filled thermosetting resin flooring material to a substrate by spreading a resin-rich layer upon the substrate and thereafter broadcasting an aggregate over the resin-rich layer.

U.S. Pat. No. 5,049,411 to Sellstrom, et al. discloses a method of bonding an aggregate filled epoxy system to wet concrete.

UK Patent No. 402,811 to Swindin describes a method of road making utilizing stone, sand and cement as the aggregate and latex, water and rubber as the binders.

The *Scientific American* of Oct. 2, 1915 suggests the use of finely pulverized iron filings in a cement mix.

Netherlands Patent No. 7,010,960 to Chemie teaches applying multiple layers of epoxy resins with several of the layers containing aggregate such as quartz or sand for coating roads, bridges and floors.

SUMMARY OF THE INVENTION

This invention relates to the production of a plastic flooring overlaid with an iron filled cementitious topcoat. This system is applied over concrete and other rigid construction materials utilizing the following composition:

a first layer comprising a mixture of a thermosetting resin, a diluent, a curing agent and silica sand; within 15 minutes after the first layer has been placed over the concrete substrate, a particulate aluminum oxide is broadcast over this first layer to saturate the same;

a second layer comprising a mixture of a thermosetting resin, a diluent and a curing agent is placed over the first layer to cover the upwardly projecting particles of aluminum oxide; this second layer will serve as a primer (bonding agent) to improve adhesion between the first layer and the third layer; and a third layer comprising a mixture of water, latex, Portland cement and ductile iron filings is placed over the second layer.

This invention is designed to protect concrete floors from extreme mechanical abuse (primarily from impact and abrasion).

DETAILED DESCRIPTION OF THE PREFERRED EMBODIMENTS

1. BASE COAT

A sand and epoxy resin mortar should be mixed in the ratios of 0.5–3.5 to 1 by weight and placed upon the substrate to a thickness of 1/6 to ¼ inches with hand trowels or screed rakes. This surface is then lightly rolled with a 3/16 inch foam roller to remove any marks.

A. BASE COAT FORMULATION I

| Example Epoxy Mortar | | % By Weight | State |
|---|---|---|---|
| (1) | Diglycidyl Ether of Bisphenol A-Epoxy Resin | 18.96 | Liquid |
| (2) | Butyl Glycidyl Ether-Reactive Diluent | 3.34 | Liquid |
| (3) | BYK-A 525-Flow Control and Air Release Agent | .18 | Liquid |
| (4) | Black Color Paste | 0.68 | Paste |
| (5) | Ancamide 500 - Amine Curing Agent | 11.14 | Liquid |
| (6) | Silica Sand U.S. Sieve #20-70 | 65.70 | Solid |

Based on the above silica loading, the acceptable ranges of the critical components (1, 2 and 5) are as follows:
(1) 10.71%–22.71%
(2) 0.00%–10.71%
(5) 10.93%–11.59%

Realizing that an adjustment in the amount of silica sand used, which is not critical to the liquid portion, the following ranges demonstrate only the liquid portion of the above mix:
(1) 44.52%–65.83%
(2) 0.00%–44.52%
(5) 31.68%–34.29%

A variety of thermosetting resin (components 1, 2, 3, 4 and 5 mixed together) types may be used for the liquid portion of the epoxy mortar and will work satisfactorily using the features of this invention as long as they meet the following requirements:

Viscosity: 400–3000 cps at 77° F.
Cure: Ambient Temperature

The product referred to above as "BYK-A 525" is an additive which is manufactured in Germany by BYK-Chemie GmbH and sold in the United States by BYK-Chemie U.S.A., 524 South Cherry Street, Wailingsworth, Conn. The BYK-A 525 compound is added to an epoxy resin flooring for the purpose of removing air bubbles. This material is a clear colorless liquid having a specific gravity of 0.85, a boiling range of 275°–385° F. and it can be described chemically as essentially polyether modified methylalkylpolysiloxane copolymer.

The product referred to above as "Ancamide 500" is a curing agent which is primarily an amidoamine intended for use with liquid epoxy resins, manufactured and sold by Air Products and Chemicals, Inc., 7201 Hamilton Boulevard, Allentown, Pa. The product is an amber liquid having a viscosity of 2.5 poise, an amine value of 445, a specific gravity of 0.95 and a flash point of 383° F. Its principle active ingredient is tetraethylenepentamine.

B. BASE COAT FORMULATION II

| Example Base Coat | | % By Weight | State |
|---|---|---|---|
| (1) | Diglycidyl Ether of Bisphenol A-Epoxy Resin | 24.4 | Liquid |
| (2) | Butyl Glycidyl Ether-Reactive Diluent | 6.2 | Liquid |
| (3) | Triethylenetetramine-Amine Curing Agent | 4.0 | Liquid |
| (4) | Silica Sand U.S. Sieve #20-70 | 65.4 | Solid |

Based on the above silica loading, the acceptable ranges of the critical components (1, 2 and 3) are as follows:
(1) 15.3%–30.6%
(2) 0.00%–15.3%
(5) 3.9%–4.0%

Realizing that an adjustment in the amount of silica sand used, which is not critical to the liquid portion, the following ranges demonstrate only the liquid portion of the above mix:
(1) 44.2%–88.6%
(2) 0.00%–44.2%
(5) 11.4%–11.6%

A variety of thermosetting resin (components 1, 2 and 3 mixed together) types may be used for the liquid portion of the base coat and will work satisfactorily using the features of this invention as long as they meet the following requirements:

Viscosity: 400–3000 cps at 77° F.
Cure: Ambient Temperature

Epoxy, polyester and vinylester resin formulated with the vast numbers of reactive and non-reactive diluents and amine curing agents are examples of thermosetting resins that will work well using the features of this invention. For example, the epoxies could be Bisphenol A (referred to above), Bisphenol F, Novolacs, Novolac solutions, Diluted Epoxy Resins and other epoxies. Amine curing agents, in addition to those referred to above, could be Aliphatic Amines (modified or unmodified), Cycloaliphatic Amines (modified or unmodified), Amidoamines, Aromatic Amines, Tertiary Amines, Polyamides and other suitable amines.

After the epoxy mortar is placed on the substrate, the surface should be lightly rolled with a 3/16 inch foam roller to remove any marks. Approximately 15 minutes after the mortar has been placed on the substrate, a particulate aluminum oxide is broadcast at a rate of 0.5–2 lbs./square foot onto the mortar to saturate the same. This system should be allowed to cure until foot traffic can be supported (approximately 3–8 hours, depending on the temperature). During curing, this area should be covered with poly sheeting to protect it from dirt and other contaminates.

The aluminum oxide is purchased from the manufacturer as a #12 oxide; the acceptable oxide range is #5 to #16 which represents an actual physical size range from 1/16 inch to ¼ inch. The particle size of the aluminum oxide is larger than the sand which is mixed in with the base coat so that the aluminum oxide which is broadcast onto the initial layer of the epoxy mortar will provide peaks and valleys to assist in bonding to the cementitious topcoat. Other acceptable materials in place of aluminum oxide are granite, color quartz, pea gravel, abrasive flint, silicon carbide, roofing granules and other similar materials; it should be understood, however, that all of the above broadcast materials should be in a size range of 1/16 inch to ¼ inch.

A. PRIMER COAT FORMULATION I

| Example<br>Epoxy Primer Coat | % By Weight |
|---|---|
| (1) Diglycidyl Ether of Bisphenol A-Epoxy Resin | 55.23 |
| (2) Butyl Glycidyl Ether-Reactive Diluent | 9.75 |
| (3) BYK-A 525-Flow Control and Air Release Agent | 0.65 |
| (4) Black Color Paste | 0.19 |
| (5) Ancamide 500 - Amine Curing Agent | 34.18 |

B. PRIMER COAT FORMULATION II

| Example<br>Epoxy Primer Coat | % By Weight |
|---|---|
| (1) Diglycidyl Ether of Bisphenol A-Epoxy Resin | 70.9 |
| (2) Butyl Glycidyl Ether-Reactive Diluent | 17.7 |
| (3) Triethylenetetramine-Amine Curing Agent | 11.4 |

The same type of thermosetting resins are available for the primer coat as are for the epoxy mortar, and will perform satisfactorily as long as they meet the same requirements.

3. CEMENTITIOUS TOPCOAT

A cementitious mortar should be mixed and placed over the wet epoxy primer to a thickness of 1/16 to ½ inches with hand trowels.

| Example<br>Cementitious Mortar | Parts | % By weight |
|---|---|---|
| Water | 198.47 | 10.45 |
| Latex | 35.15 | 1.85 |
| Ductile Iron Filings | 666.60 | 35.08 |
| Cement | 1000.00 | 52.62 |

This is then finished as a standard concrete surface.

The following are specific examples setting forth the details of the preferred embodiments of the method:

EXAMPLE I

1. Base Coat 28.86 lbs. of Diglycidyl Ether of Bisphenol A-Epoxy Resin were mixed with 5.09 lbs. of Butyl Glycidyl Ether-Reactive Diluent, 0.27 lbs. of BYK-A 525—Flow Control and Air Release Agent, 1.02 lbs. of Black Color Paste, 16.95 lbs. of Ancamide 500—Amine Curing Agent and 100 lbs. of Silica Sand U.S. Sieve #20–70 and were placed upon the substrate over 100 square feet to a thickness of approximately 3/16 inch using screed rakes and hand trowels. The surface was then lightly rolled with a 3/16 inch foam roller to remove any marks. Approximately 15 minutes after the mortar was placed upon the substrate, 150 lbs. or particulate aluminum oxide was broadcast over the mortar to saturate with some excess (approximately 20 lbs. excess). The ambient temperature was approximately 80° F. After approximately 5 hours, the surface was brushed to remove the excess aluminum oxide. Approximately 130 lbs. of particulate aluminum oxide remained embedded in the mortar.

2. Primer Coat 8.07 lbs. of Diglycidyl Ether of Bisphenol A-Epoxy Resin were mixed with 1.42 lbs. of Butyl Glycidyl Ether-Reactive Diluent, 0.08 lbs. of BYK-A 525—Flow Control and Air Release Agent, 0.28 lbs. of Black Color Paste and 4.74 lbs. of Ancamide 500—Amine Curing Agent and were rolled onto the 100 square feet of base coat (over the aluminum oxide) to a thickness of 10–20 mils using a 3/16 inch knapp roller. Some of the primer coat settled into the valleys between the peaks of aluminum oxide; thus, the thickness of the primer coat varied between 10 mils at the top to 20 mils in the valleys.

3. Cementitious Topcoat

Within two hours (while the primer was still wet), 14.36 lbs. of water were mixed with 2.54 lbs. of latex, 48.24 lbs. of iron filings and 72.37 lbs. of Portland cement and applied over the primer coat with hand trowels. The cementitious topcoat was sufficiently thick to cover the tops of the aluminum oxide projections and, considering the fact that this topcoat filled in the valleys, the topcoat varied between 1/16 and ⅛ inch in thickness.

EXAMPLE II

1. Base Coat 37.75 lbs. of Diglycidyl Ether of Bisphenol A-Epoxy Resin were mixed with 9.44 lbs. of Butyl Glycidyl Ether-Reactive Diluent, 6.09 lbs. of Triethylenetetramine—Amine Curing Agent and 100 lbs. of Silica Sand U.S. Sieve #20–70 and were placed upon the substrate over 100 square feet to a thickness of approximately 3/16 inch using screed rakes and hand trowels. The surface was then lightly rolled with a 3/16 inch foam roller to remove any marks. Approximately 15 minutes after the mortar was placed upon the substrate, 150 lbs. of particulate aluminum oxide was broadcast over the mortar to saturate with some excess (approximately 20 lbs. excess). The ambient temperature was approximately 80° F. After approximately 5 hours, the surface was brushed to remove the excess aluminum oxide. Approximately 130 lbs. of particulate aluminum oxide remained embedded in the base coat.

2. Primer Coat 10.57 lbs. of Diglycidyl Ether of Bisphenol A-Epoxy Resin were mixed with 2.64 lbs. of Butyl Glycidyl Ether-Reactive Diluent, and 1.70 lbs. of Triethylenetetramine—Amine Curing Agent and were rolled onto the 100 square feet of base coat (over the aluminum oxide) to a thickness of 10–20 mils using a 3/16 inch knapp roller. Some of the primer coat settled into the valleys between the peaks of aluminum oxide; thus, the thickness of the primer coat varied between 10 mils at the top to 20 mils in the valleys.

3. Cementitious Topcoat

Within two hours (while the primer is still wet), 16.36 lbs. of water were mixed with 2.54 lbs. of latex, 48.24 lbs. of iron filings and 72.37 lbs. of Portland cement and applied over the primer coat with hand trowels. The cementitious topcoat was sufficiently thick to cover the tops of the aluminum oxide projections and, considering the fact that this topcoat filled in the valleys, the topcoat varied between 1/16 and ⅛ inch in thickness.

Whereas, the present invention has been described in particular relation to the examples set forth herein, other and further modifications, apart from those shown or suggested herein, may be made within the spirit and scope of this invention.

What is claimed is:

1. A method for protecting concrete floors by applying, over the concrete floor, a first layer comprising a thermosetting resin compound containing an aggregate filler; broadcasting aggregate onto the first layer to saturate the same such that the broadcast aggregate becomes mixed into the first layer; removing loose, excess aggregate from first layer after the first layer has cured; applying a second layer over the first layer, the second layer comprising a thermosetting resin compound; applying, over the second layer while the second layer is still wet, a third layer comprising a latex-based cementitious material filled with ductile iron filings.

2. A method according to claim 1 wherein the first layer comprises a mixture of an epoxy resin, a curing agent and sand.

3. A method according to claim 1 wherein the aggregate which is broadcast onto the first layer is particulate aluminum oxide.

4. A method according to claim 3 wherein the second layer comprises a mixture of an epoxy resin and a curing agent.

5. A method according to claim 4 wherein the third layer comprises a mixture of water, latex, ductile iron filings and Portland cement.

6. A method according to claim 1 wherein the first layer is approximately 1/16 inch to ¼ inch thick and includes approximately 10.7 to 22.7% by weight of Diglycidyl Ether of Bisphenol A-Epoxy Resin, 0 to 10.7% by weight of Butyl Glycidyl Ether-Reactive Diluent, 0.18% by weight of an air release agent, 10.9 to 11.6% by weight of an amidoamine curing agent and 65.70% by weight of Silica Sand, U.S. Sieve #20–70; and wherein a particle size of 1/16 inch to ¼ inch aluminum oxide is broadcast over the first layer within 15 minutes after the application of the first layer over the substrate, the aluminum oxide being applied in the amount of about 0.5 to 2 lbs. per square foot to saturate the first layer.

7. A method according to claim 6 wherein the first layer is approximately 1/16 inch to ¼ inch thick and includes approximately 18.96% by weight of Diglycidyl Ether of Bisphenol A-Epoxy Resin, 3.34% by weight of Butyl Glycidyl Ether-Reactive Diluent, 0.18% by weight of an air release agent, 11.14% by weight of an amidoamine curing agent and 65.70% by weight of Silica Sand, U.S. Sieve #20–70; and wherein a particle size of 1/16 inch to ¼ inch aluminum oxide is broadcast over the first layer within 15 minutes after the application of the first layer over the substrate, the aluminum oxide being applied in the amount of about 0.5 to 2 lbs. per square foot to saturate the first layer.

8. A method according to claim 6 wherein the second layer is applied over the first layer to a thickness of about 10–50 mils, the second layer comprising a mixture of about 44.5 to 65.8% by weight of Bisphenol A, approximately 0 to 44.5% by weight of Butyl Glycidyl Ether, approximately 0.65 % by weight of an air release agent and approximately 31.6 to 34.3% by weight of an amidoamine curing agent.

9. A method according to claim 8 wherein the second layer is applied over the first layer to a thickness of about 10–50 mils, the second layer comprising a mixture of about 55% by weight of Bisphenol A, approximately 9.75% by weight of Butyl Glycidyl Ether, approximately 0.65% by weight of an air release agent and approximately 34% by weight of an amidoamine curing agent.

10. A method according to claim 8 wherein the third layer is applied over the second layer to a thickness of 1/16 inch to ½ inch, the third layer comprising a mixture of approximately 10.45% by weight of water, approximately 1.85% by weight of latex, approximately 35.08% by weight of ductile iron filings and approximately 52.62% by weight of Portland cement.

11. A method according to claim 1 wherein the first layer is approximately 1/16 inch to ¼ inch thick and includes approximately 15.3% to 30.6% by weight of Diglycidyl Ether of Bisphenol A-Epoxy Resin, 0% to 15.3% by weight of Butyl Glycidyl Ether-Reactive Diluent, 3.9% to 4.0% by weight of Triethylenetetramine-Curing Agent, and 65.4% by weight of Silica Sand, U.S. Sieve #20–70; and wherein a particle size of 1/16 inch aluminum oxide is broadcast into the first layer within 15 minutes after the application of the first layer, the aluminum oxide being applied in the amount of about 0.5 to 2 lbs. per square foot to saturate the first layer, becoming an integral part of the first layer.

12. A method according to claim 11 wherein the first layer is approximately 1/16 inch to ¼ inch thick and includes approximately 24.4% by weight of Diglycidyl Ether of Bisphenol A-Epoxy Resin, 6.2% by weight of Butyl Glycidyl Ether-Reactive Diluent, 4.0% by weight of Triethylenetetramine-Curing Agent and 65.4% by weight of Silica Sand, U.S. Sieve #20–70, and wherein a particle size of 1/16 inch to ¼ inch aluminum oxide is broadcast into the first layer within 15 minutes after the application of the first layer, the aluminum oxide being applied in the amount of about 0.5 to 2 lbs. per square foot to saturate the first layer, becoming mixed into the first layer.

13. A method according to claim 11 wherein the second layer is applied over the first layer to a thickness of 10–50 mils, the second layer comprising a mixture of approximately 44.2% to 88.6% by weight of Diglycidyl Ether of Bisphenol A-Epoxy Resin, approximately 0%–44.2% by weight of Butyl Glycidyl Ether-Reactive Diluent, and approximately 11.4% to 11.6% by weight of Triethylenetetramine-Curing Agent.

14. A method according to claim 13 wherein the second layer is applied over the first layer to a thickness of approximately 70.9% by weight of Diglycidyl Ether of Bisphenol A-Epoxy Resin, approximately 17.7% by weight of Butyl Glycidyl Ether-Reactive Diluent and 11.4% by weight Triethylenetetramine-Curing Agent.

* * * * *